(12) United States Patent
Kim et al.

(10) Patent No.: US 12,462,607 B2
(45) Date of Patent: Nov. 4, 2025

(54) METHOD FOR PROVIDING NECESSARY INFORMATION FOR DIAGNOSIS OF ALZHEIMER'S DISEASE FROM PHOTOGRAPHED IMAGE OF PATIENT USING DEEP LEARNING AND APPARATUS FOR EXECUTING THE METHOD

(71) Applicant: AJOU UNIVERSITY INDUSTRY-ACADEMIC COOPERATION FOUNDATION, Suwon-si (KR)

(72) Inventors: Do Young Kim, Suwon-si (KR); Myung Hoon Sunwoo, Seoul (KR); Young Jun Lim, Gwacheon-si (KR); Joon-Hyeon Park, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 498 days.

(21) Appl. No.: 17/972,057

(22) Filed: Oct. 24, 2022

(65) Prior Publication Data
US 2023/0125925 A1    Apr. 27, 2023

(30) Foreign Application Priority Data
Oct. 25, 2021    (KR) .......................... 10-2021-0142484

(51) Int. Cl.
*G06V 40/18*    (2022.01)
*G06T 7/00*     (2017.01)
(Continued)

(52) U.S. Cl.
CPC .......... *G06V 40/193* (2022.01); *G06T 7/0012* (2013.01); *G06V 10/764* (2022.01);
(Continued)

(58) Field of Classification Search
None
See application file for complete search history.

(56) References Cited

U.S. PATENT DOCUMENTS 9,149,184 B2 *  10/2015  Campbell .............. A61B 6/037
9,521,975 B2    12/2016  Verdooner et al.
(Continued)

FOREIGN PATENT DOCUMENTS

CN    106408562 A    2/2017
CN    108764286 A    11/2018
(Continued)

OTHER PUBLICATIONS

Communication dated Jun. 22, 2023 issued by the Korean Patent Office in application No. 10-2021-0142484.
(Continued)

*Primary Examiner* — Tahmina N Ansari
(74) *Attorney, Agent, or Firm* — Sughrue Mion, PLLC (57) ABSTRACT

Disclosed are a method for providing the necessary information for a diagnosis of Alzheimer's disease and an apparatus for executing the method. The apparatus for executing the method for providing the necessary information for a diagnosis of Alzheimer's disease includes one or more processors, a memory, and one or more programs, in which the one or more programs are stored in the memory and configured to be executed by the one or more processors, the one or more programs includes an instruction for acquiring a photographed image of a patient's eyeball, an instruction for preprocessing the photographed image, generating a blood vessel image from the pre-processed photographed image using machine learning-based technology, and providing the necessary information for a diagnosis of Alzheimer's disease based on the generated blood vessel image, and an instruction for generating diagnostic prediction informa-
(Continued)

tion based on the necessary information for a diagnosis of Alzheimer's disease.

13 Claims, 7 Drawing Sheets

(51) Int. Cl.
    *G06V 10/764* (2022.01)
    *G06V 10/77* (2022.01)
    *G16H 50/30* (2018.01)

(52) U.S. Cl.
    CPC ......... *G06V 10/7715* (2022.01); *G16H 50/30* (2018.01); *G06T 2207/30041* (2013.01); *G06T 2207/30101* (2013.01); *G06V 2201/03* (2022.01); *G06V 2201/07* (2022.01)

(56) References Cited

U.S. PATENT DOCUMENTS

| | | |
|---|---|---|
| 10,580,530 B2 | 3/2020 | Rim et al. |
| 2019/0313895 A1* | 10/2019 | Hayashi ............... G06F 18/285 |
| 2020/0257879 A1 | 8/2020 | Solanki et al. |
| 2020/0394789 A1* | 12/2020 | Freund ................. G06T 7/0012 |
| 2023/0125925 A1* | 4/2023 | Kim ....................... G16H 50/30 382/128 |
| 2023/0245772 A1* | 8/2023 | Fang ..................... G06T 7/0012 705/2 |

FOREIGN PATENT DOCUMENTS

| | | |
|---|---|---|
| KR | 10-2004-0015168 A | 2/2004 |
| KR | 10-2020-0005409 A | 1/2020 |
| KR | 10-2021-0026597 A | 3/2021 |
| WO | 2021243246 A1 | 12/2021 |

OTHER PUBLICATIONS

Communication dated Mar. 16, 2023 issued by the European Patent Office in application No. 22203440.7.

* cited by examiner

METHOD FOR PROVIDING NECESSARY INFORMATION FOR DIAGNOSIS OF ALZHEIMER'S DISEASE FROM PHOTOGRAPHED IMAGE OF PATIENT USING DEEP LEARNING AND APPARATUS FOR EXECUTING THE METHOD

CROSS-REFERENCE TO RELATED APPLICATION

This application claims the benefit under 35 USC § 119(a) of Korean Patent Application No. 10-2021-0142484, filed on Oct. 25, 2021, in the Korean Intellectual Property Office, the entire disclosure of which is incorporated herein by reference for all purposes.

BACKGROUND

1. Field

Embodiments of the present disclosure relate to a technology for providing the necessary information for a diagnosis of Alzheimer's disease.

2. Description of Related Art

Alzheimer's disease, also called dementia or Alzheimer's disease (AD), is a progressive degenerative disease that results in memory loss and severe mental retardation.

Diagnosticians have long sought a means to clearly identify the AD during the lifetime of a dementia patient, in addition to a histological examination of brain tissue, which is currently the only available means for diagnosing the AD.

The AD is the most common form of dementia, accounting for more than half of all dementia cases, reaching 4 million people in the United States, and affecting nearly 15 million people worldwide. Dementia begins with slight memory loss and confusion, and progresses over time with severe impairment of intellectual and social abilities.

The prevalence of AD in the 65-year-old is 1-2%. In the 75-year-old, this figure rises to 7%, and it is 18% at aged 85 years. The prevalence of dementia in all individuals over 65 years of age is 8%. The prevalence of dementia in people living in institutions is approximately 50% at all ages. Alzheimer's dementia has a huge social impact, especially in the later stages of the disease, putting a huge burden on caregivers. Significant economic costs are a major cause of supportive care and hospitalization in institutions. A rapid increase in the proportion of the elderly population in society means that the number of people with the AD increases rapidly. For this reason, early diagnosis of the AD and discovery of treatments are becoming important issues worldwide.

However, the current diagnosis of dementia has a problem in that it is difficult for a patient to easily access the dementia diagnosis because expensive examination costs, such as brain imaging tests using CT, MRI, PET, etc., diagnostic medical examination using blood test, chest X-ray, urine test, electrocardiogram, etc., cerebrospinal fluid test as an invasive diagnostic method, are required or the examination process is complicated.

PRIOR ART LITERATURE

Patent Literature
  PTL 1: Korean unexamined patent application publication No. 10-2004-0015168 (Feb. 18, 2004)

SUMMARY

Embodiments of the present disclosure are to provide the necessary information for a diagnosis of Alzheimer's disease from a photographed image of a patient using deep learning technology.

According to an exemplary embodiment of the present disclosure, there is provided a computing device including one or more processors, a memory, and one or more programs, in which the one or more programs are stored in the memory and configured to be executed by the one or more processors, the one or more programs includes an instruction for acquiring a photographed image obtained by photographing a patient's eyeball, an instruction for preprocessing the photographed image, generating a blood vessel image from the pre-processed photographed image using machine learning-based technology, and providing necessary information for a diagnosis of Alzheimer's disease based on the generated blood vessel image, and an instruction for generating diagnostic prediction information based on the necessary information for the diagnosis of Alzheimer's disease.

The instruction for providing the necessary information for the diagnosis of Alzheimer's disease may further include an instruction for generating a data set by extracting a retinal region from the acquired photographed image, and an instruction for classifying a patient's risk rating for Alzheimer's disease from the data set by receiving the data set using a machine learning module.

The instruction for generating the data set may further include an instruction for generating a retinal image by extracting a retinal region from the acquired photographed image, an instruction for adjusting the retinal image to a preset size, and an instruction for normalizing the adjusted retinal image.

The instruction for classifying the patient's risk rating for Alzheimer's disease may further include an instruction for generating a feature map from a retinal image included in the data set by receiving the data set using an encoder module, an instruction for generating the blood vessel image based on the feature map by receiving the feature map using a decoder module, an instruction for generating a final blood vessel image based on the retinal image, the feature map, and the blood vessel image by receiving the retinal image, the feature map, and the blood vessel image using a generation module, and an instruction for performing category classification to provide the necessary information for the diagnosis of Alzheimer's disease based on the final blood vessel image by receiving the final blood vessel image using a classification module.

The encoder module may be trained to generate a feature map through a convolution operation while moving a first filter to the retinal image by receiving the retinal image.

The decoder module may be trained to generate a blood vessel image from the feature map through a deconvolution operation while moving a second filter to the feature map by receiving the generated feature map.

The generation module may be trained to divide the feature map and the blood vessel image into the same size, respectively, by receiving the retinal image, the feature map, and the blood vessel image, generate a similarity distribution by comparing similarities between any one of a plurality of the divided blood vessel images and a plurality of the divided feature maps, respectively, reflect the similarity distribution in the retinal image, and extract a blood vessel from a region corresponding to any one of the plurality of divided blood vessel images from the retinal image using the retinal image in which the similarity distribution is reflected and any one of the plurality of divided blood vessel images.

The instruction for generating the final blood vessel image may further include an instruction for repeating so that blood vessels are extracted from all regions of the retinal image by the generation module, and an instruction for generating a final blood vessel image by using the blood vessels extracted from all regions of the retinal image.

The classification module may be trained to classify a risk rating for Alzheimer's disease based on a preset reference image and the generated final blood vessel image by receiving the final blood vessel image.

According to the embodiments of the present disclosure, the diagnosis costs can be significantly reduced by providing the necessary information for the diagnosis of Alzheimer's disease based on the photographed image of a patient without using the conventional CT or MRI.

In addition, according to the embodiments of the present disclosure, Alzheimer's disease can be easily diagnosed and Alzheimer's disease can be detected early by providing the necessary information for the diagnosis of Alzheimer's disease from the photographed image using deep learning technology.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, terms "transfer", "communication", "transmission", "reception", and other similar meanings of a signal or information refer to not only direct transmission of the signal or information from one component to another, but also transmission of the signal or information through another component. In particular, to "transfer" or "transmit" a signal or information to a component indicates that the signal or information is "transferred" or "transmitted" to a final destination of the signal or information, and does not imply that the signal or information is "transferred" or "transmitted" to a direct destination. The same is true for "reception" of a signal or information. In addition, in this specification, when two or more pieces of data or information are "related", it means that when one piece of data (or information) is acquired, at least a part of the other pieces of data (or information) can be acquired on the basis thereof.

Meanwhile, an embodiment of the present disclosure may include a program for performing the methods described in this specification on a computer, and a computer-readable recording medium including the program. The computer-readable recording medium may include program instructions, local data files, local data structures, etc. alone or in combination. The medium may be specially designed and configured for the present disclosure, or may be commonly used in the field of computer software. Examples of computer-readable recording media include magnetic media such as hard disks, floppy disks, and magnetic tapes, optical recording media such as CD-ROMs and DVDs, and a hardware device specially configured to store and execute program instructions, such as ROM, RAM, flash memory, etc. Examples of the program may include not only machine language codes such as those generated by a compiler, but also high-level language codes that can be executed by a computer using an interpreter or the like.

Figure 1:
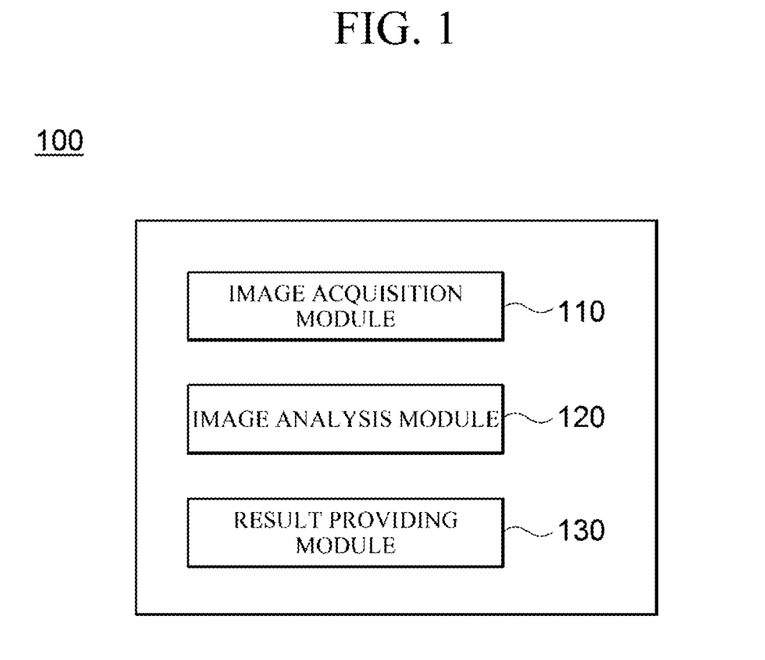
FIG. 1 is a block diagram for describing a configuration of an apparatus for providing the necessary information for a diagnosis of Alzheimer's disease according to an embodiment of the present disclosure.

FIG. 1 is a block diagram for describing the configuration of an apparatus for providing necessary information for a diagnosis of Alzheimer's disease according to an embodiment of the present disclosure.

The apparatus for providing the necessary information for the diagnosis of Alzheimer's disease according to an embodiment of the present disclosure may be implemented in the form of an application (or in program form) in a user terminal, extract a blood vessel image from a photographed image (image including a retinal region), and provide the necessary information for the diagnosis of Alzheimer's disease based on the extracted blood vessel image. The application may be stored in a computer-readable storage medium of the user terminal. The application includes a predetermined set of instructions executable by a processor of the user terminal. The instruction may cause the processor of the user terminal to perform an operation according to an exemplary embodiment. The computer-readable storage medium of the user terminal includes components of an operating system for executing the set of instructions, such as the application, on the user terminal. For example, the operating system may be Apple's iOS or Google's Android. The user terminal may be a fixed terminal implemented as a computer device or a mobile terminal. Examples of the user terminal include a smart phone, a mobile phone, a computer, a notebook computer, a digital broadcasting terminal, and a tablet PC.

FIG. 1 is a block diagram for describing a configuration of an apparatus 100 for providing necessary information for a diagnosis of Alzheimer's disease according to an embodiment of the present disclosure.

The apparatus 100 for providing the necessary information for the diagnosis of Alzheimer's disease according to an embodiment of the present disclosure may be implemented in the form of an application (or program form) in the user terminal to extract a blood vessel image from a photographed image (image including a retinal region), and may provide the necessary information for the diagnosis of Alzheimer's disease based on the blood vessel image. The application may be stored in a computer-readable storage medium of the user terminal. The application includes a predetermined set of instructions executable by a processor of the user terminal. The instruction may cause the processor of the user terminal to perform an operation according to an exemplary embodiment. The computer-readable storage medium of the user terminal includes components of an operating system for executing the set of instructions, such as the application, on the user terminal. For example, the operating system may be Apple's iOS or Google's Android. The user terminal may be a fixed terminal implemented as a computer device or a mobile terminal. Examples of the user terminal include a smart phone, a mobile phone, a computer, a notebook computer, a digital broadcasting terminal, a tablet PC, etc.

Referring to FIG. 1, the apparatus 100 for providing the necessary information for the diagnosis of Alzheimer's disease may include an image acquisition module 110, an image analysis module 120, and a result providing module 130.

In this specification, a module may mean a functional and structural combination of hardware for carrying out the technical idea of the present disclosure and software for driving the hardware. For example, the "module" may mean a logical unit of a predetermined code and hardware resource for executing the predetermined code, and does not necessarily mean physically connected code or a single type of hardware.

Figure 2:
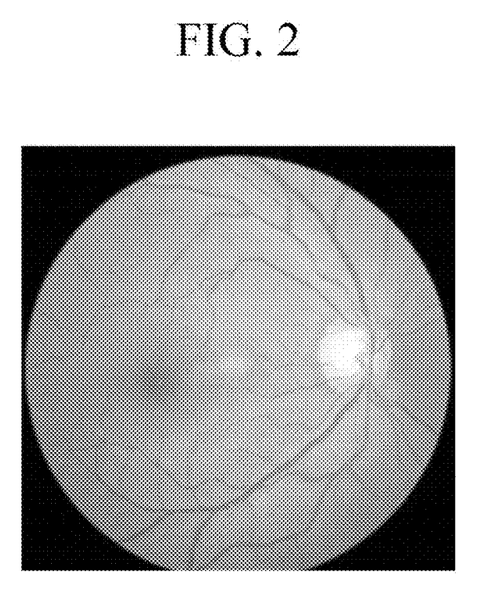
FIG. 2 is a view illustrating an image obtained by photographing the retina of a patient according to an embodiment of the present disclosure.

The image acquisition module 110 may acquire a photographed image of a patient. For example, the image acquisition module 110 may acquire an image (photographed image) in which a patient's retina is photographed, as illustrated in FIG. 2, through a lens for photographing a fundus image located in front of the patient using a camera integrally formed in the user terminal according to a user's operation. However, the present disclosure is not limited thereto, and a photographed image photographed by a device other than the user terminal may be acquired.

The image acquisition module 110 may provide the acquired image to an image analyzer. Meanwhile, before the retina is photographed by the image acquisition module 110, the patient's pupil may be dilated by administering a mydriatic agent to the patient's eye. In this case, it is possible to acquire a photographed image of good quality through the pupil dilated by the mydriatic agent. However, it is not necessary to administer the mydriatic agent to the patient's eye.

The image analysis module 120 may pre-process the photographed image and extract a blood vessel image from the pre-processed photographed image using machine learning-based technology to provide the necessary information for the diagnosis of Alzheimer's disease. A detailed description of the operation and configuration of the image analysis module 120 will be described later with reference to FIG. 2.

The result providing module 130 may generate diagnostic prediction information based on a result output from the image analysis module 120 and provide the diagnostic prediction information to the user. For example, the result providing module 130 may provide the user with a probability that a patient will be diagnosed with Alzheimer's disease and a degree of risk according to the probability based on the diagnosis result.

Therefore, the apparatus 100 for providing the necessary information for the diagnosis of Alzheimer's disease according to an embodiment of the present disclosure can significantly reduce diagnostic costs by providing the necessary information for the diagnosis of Alzheimer's disease based on the photographed image of the patient without using the conventional CT or MRI.

In addition, the Alzheimer's disease diagnosis apparatus according to an embodiment of the present disclosure can easily diagnose Alzheimer's disease and detect Alzheimer's disease early by providing the necessary information for the diagnosis of Alzheimer's disease from a photographed image using deep learning technology.

Figure 3:
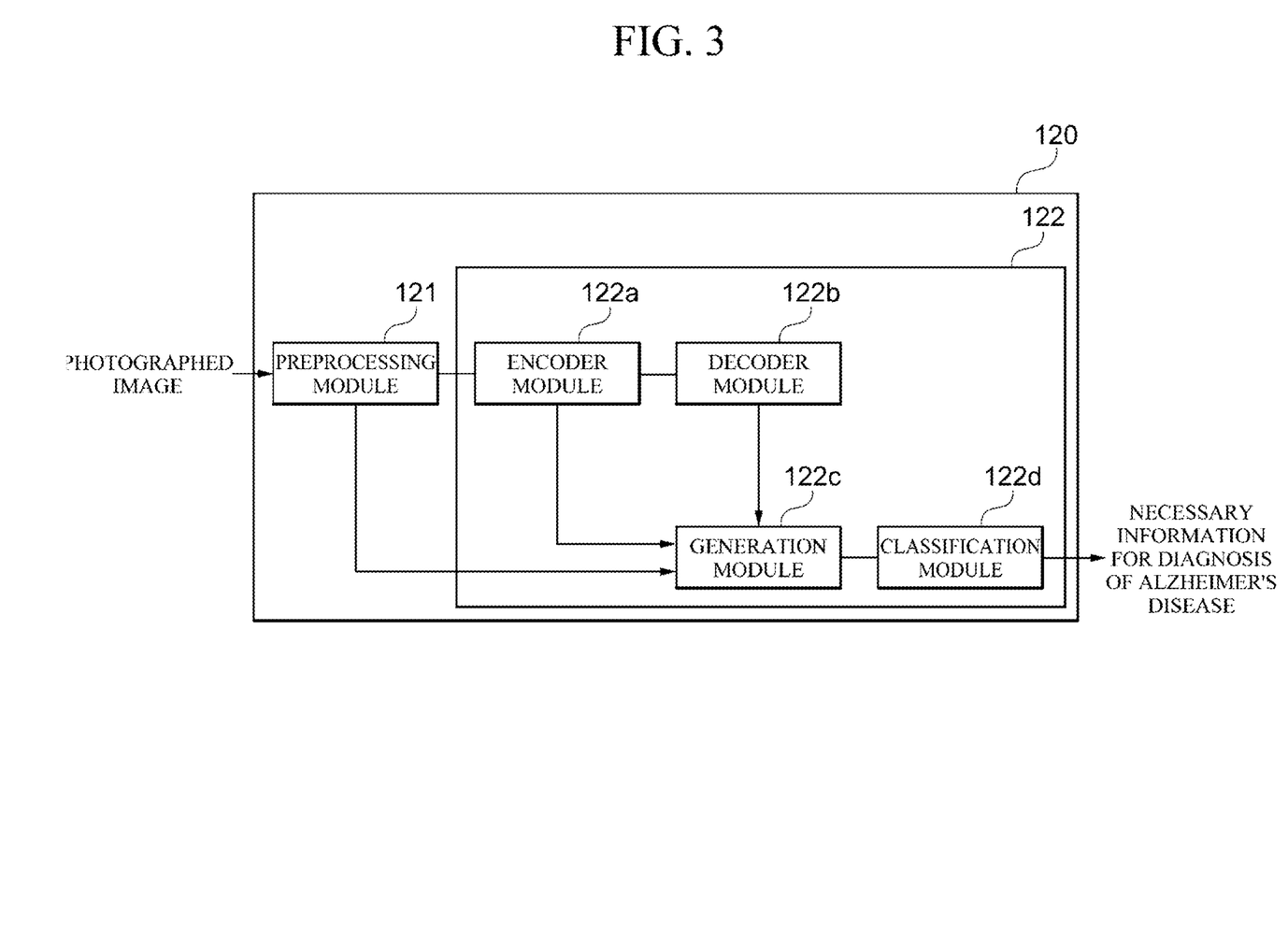
FIG. 3 is a block diagram illustrating an image analysis module of the apparatus for providing the necessary information for the diagnosis of Alzheimer's disease according to an embodiment of the present disclosure.

FIG. 3 is a block diagram illustrating the image analysis module 120 of the apparatus 100 for providing the necessary information for the diagnosis of Alzheimer's disease according to an embodiment of the present disclosure.

Referring to FIG. 3, the image analysis module 120 may include a preprocessing module 121 and a machine learning module 122.

The preprocessing module 121 may extract a retinal region from the photographed image input from the image acquisition module 110, and readjust (image (retinal image) acquired by extracting the retinal region from the photographed image) to a set size and resize the extracted retinal image. The preprocessing module 121 may use a resizing algorithm to readjust and resize the extracted retinal image.

In addition, the preprocessing module 121 may generate a data set by normalizing the retinal image adjusted to the set size. Normalization is intended to share a uniform distribution in which all input dimensions are similar, and a mean-standard deviation normalization method can be used.

The preprocessing module 121 may transfer the generated data set to the machine learning module 122.

Figure 4:
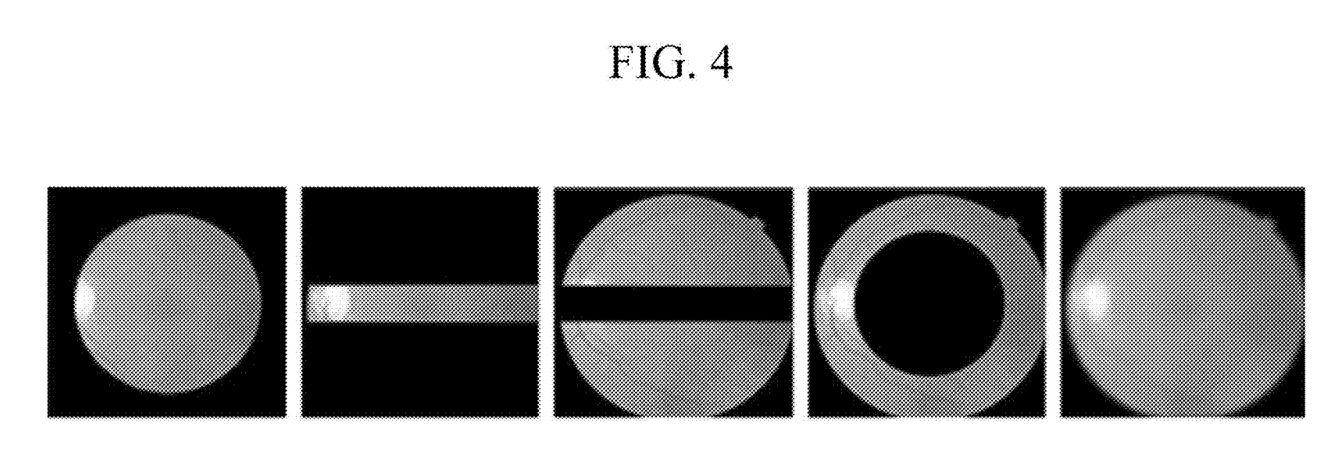
FIG. 4 is a view illustrating a retinal image to which noise or a mask is applied, which is input to a machine learning module of the apparatus for providing the necessary information for the diagnosis of Alzheimer's disease according to an embodiment of the present disclosure.

The machine learning module 122 is trained to provide the necessary information for the diagnosis of Alzheimer's disease using machine learning-based technology when the data set provided from the preprocessing module 121 is input. That is, the machine learning module 122 may be implemented as a machine learning model trained to extract a blood vessel image from a retinal image included in a data set by receiving the data set from the preprocessing module 121, and provide the necessary information for the diagnosis of Alzheimer's disease based on the extracted blood vessel image. In this case, as illustrated in FIG. 4, by inputting the retinal image to which random noise or a mask that covers a part is applied as a data set in order to train the machine learning model, the machine learning model can be trained to be robust in situations where there is no mydriatic agent or obtaining a low-quality image.

In an example embodiment, the machine learning module 122 may include an encoder module 122a, a decoder module 122b, a generation module 122c, and a classification module 122d.

The encoder module 122a may be a neural network configuring a part of the machine learning module 122. The encoder module 122a may generate a feature map of the retinal image.

In an exemplary embodiment, the encoder module 122a may generate a feature map from the retinal image using a convolution model by receiving the retinal image from the preprocessing module 121. In this case, the encoder module 122a may receive the retinal image and may be trained to generate the feature map through a convolution operation while moving a first filter to the retinal image in a sliding window method. Here, the first filter may give a weight which is sequentially set to each pixel of the retina image. The weight set to the first filter may be a value trained to extract a feature (blood vessel) from the retinal image.

The decoder module 122b may be a neural network configuring a part of the machine learning module 122. The decoder module 122b may generate a blood vessel image based on the feature map of the extracted retinal image.

In an exemplary embodiment, the decoder module 122b may generate a blood vessel image from the feature map using a deconvolution model by receiving the feature map from the encoder module 122a. In this case, the decoder module 122b may receive the feature map and may be trained to generate an image through a deconvolution operation while applying a second filter to the feature map. Here, the second filter may give a weight to the feature map. The weight set to the second filter may be a value trained to generate an image from the feature map.

The generation module 122c may be a neural network configuring a part of the machine learning module 122. The generation module 122c may generate a final blood vessel image based on the retinal image, the feature map of the retinal image, and the blood vessel image.

In an exemplary embodiment, the generation module 122c may extract the blood vessel from the retinal image based on an already trained blood vessel extraction model when the retinal image, the feature map of the retinal image, and the blood vessel image are input. In this case, the blood vessel extraction model may be trained to divide the feature map of the retinal image and the blood vessel image into the same size, respectively, by receiving the retina image, the feature map of the retinal image, and the blood vessel image, generate a similarity distribution by comparing similarities between any one (blood vessel patch) of the divided blood vessel images and a feature map (feature patch) of a plurality of the divided retinal images, reflect the similarity distribution in the retinal image, and extract the blood vessel from a region (part of image) corresponding to the blood vessel patch from the retinal image using the retinal to which the similarity distribution is reflected image and the blood vessel patch.

Specifically, the generation module 122c may divide the feature map of the retinal image and the blood vessel image into the same size, respectively, calculate a similarity score by comparing similarities between any one (first blood vessel patch) of the divided blood vessel images and the feature map (feature patch) of the plurality of divided retinal images, respectively, and generate a first similarity distribution. Here, the similarity score may have a higher value as the similarity increases. In addition, the similarity distribution may be a filter of the same size as the feature map of the retinal image, and the similarity distribution may can be generated by, for example, distributing values such that the sum of all the calculated similarity scores becomes 1.

In addition, the generation module 122c may reflect the first similarity distribution in the retinal image and extract a blood vessel from a region corresponding to the first blood vessel patch from the retinal image using the retinal image to which the first similarity distribution is reflected and the first blood vessel patch.

Meanwhile, the generation module 122c may generate a final blood vessel image by repeatedly performing the blood vessel extraction model N times (where N is the number of divided blood vessel images) and using the blood vessels each extracted from the blood vessel extraction model. That is, when extracting the blood vessel from the region corresponding to the blood vessel patch, the generation module 122c may more accurately extract the blood vessel by reflecting the similarity distribution in the retinal image and highlighting a region related to the blood vessel to be extracted.

Figure 5:
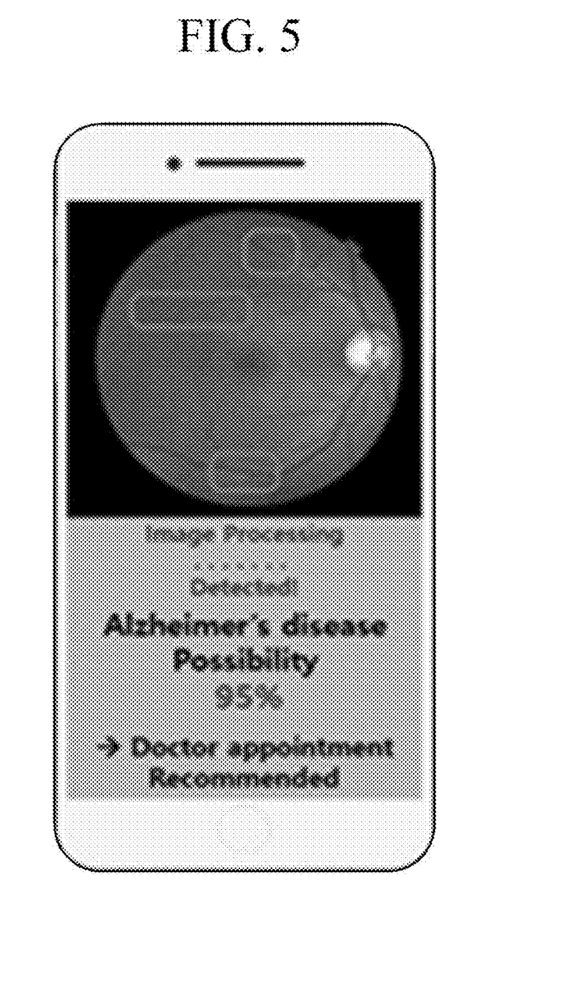
FIG. 5 is a diagram illustrating a screen of a user terminal on which diagnosis prediction information is provided according to an embodiment of the present disclosure.

The classification module 122d may be a neural network configuring a part of the machine learning module 122. The classification module 122d may perform category classification to provide the necessary information for the diagnosis of Alzheimer's disease based on the final blood vessel image input from the generation module 122c. Here, the category is the degree of risk for Alzheimer's disease, may indicate a probability of being diagnosed with Alzheimer's disease, for example, as illustrated in FIG. 5, and may provide a user with the degree of risk according to the probability.

In an exemplary embodiment, the classification module 122d may classify the risk rating for Alzheimer's disease by receiving the final blood vessel image from the generation module 122c. In this case, the classification module 122d may receive the final blood vessel image extracted from the photographed image, and may be trained to classify the risk rating for Alzheimer's disease based on a preset reference image (image of a blood vessel in a steady state) and the final blood vessel image. That is, when the final blood vessel image is input, the classification module 122d may classify the photographed image according to a pre-stored category (risk rating for Alzheimer's disease), based on the final blood vessel image, by the machine learning model.

Figure 6:
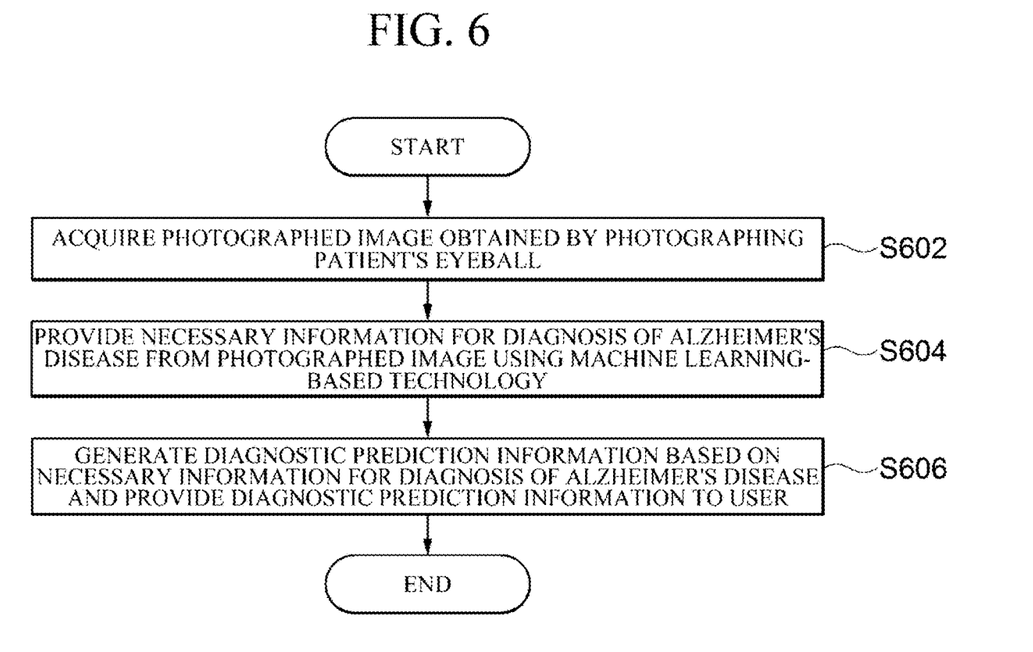
FIG. 6 is a flowchart illustrating a method for providing the necessary information for the diagnosis of Alzheimer's disease according to an embodiment of the present disclosure.

FIG. 6 is a flowchart illustrating a method for providing the necessary information for the diagnosis of Alzheimer's disease according to an embodiment of the present disclosure. The method illustrated in FIG. 6 may be performed, for example, by the apparatus 100 providing the necessary information for the diagnosis of Alzheimer's disease described above. In the illustrated flowchart, the method is described by dividing the method into a plurality of steps, but at least some of the steps may be performed in a different order, may be performed in combination with other steps, may be omitted, may be performed by being divided into detailed steps, or may be performed by being added with one or more steps (not illustrated).

The image acquisition module 110 acquires a photographed image of the patient (S602). For example, the image acquisition module 110 may acquire an image (photographed image) in which a patient's retina is photographed through a lens for photographing a fundus image positioned in front of the patient using a camera integrally formed in the user terminal according to a user's operation.

Then, the image analysis module 120 pre-processes the photographed image and extracts the blood vessel image from the pre-processed photographed image to diagnose Alzheimer's disease using machine learning-based technology (S604). Specifically, the image analysis module 120 may pre-process the photographed image input from the image acquisition module 110 to generate the data set, and extract a blood vessel image from the data set through the machine learning module 122 and classify the risk rating for Alzheimer's disease based on the extracted blood vessel image. The machine learning module 122 may include a machine learning model that is trained to diagnose Alzheimer's disease from the data set.

Finally, the result providing module 130 generates diagnostic prediction information based on the diagnostic result output from the image analysis module 120 and provides the diagnostic prediction information to the user (S606). For example, the result providing module 130 may provide the user with a probability that a patient will be diagnosed with Alzheimer's disease and the degree of risk according to the probability based on the diagnosis result.

Figure 7:
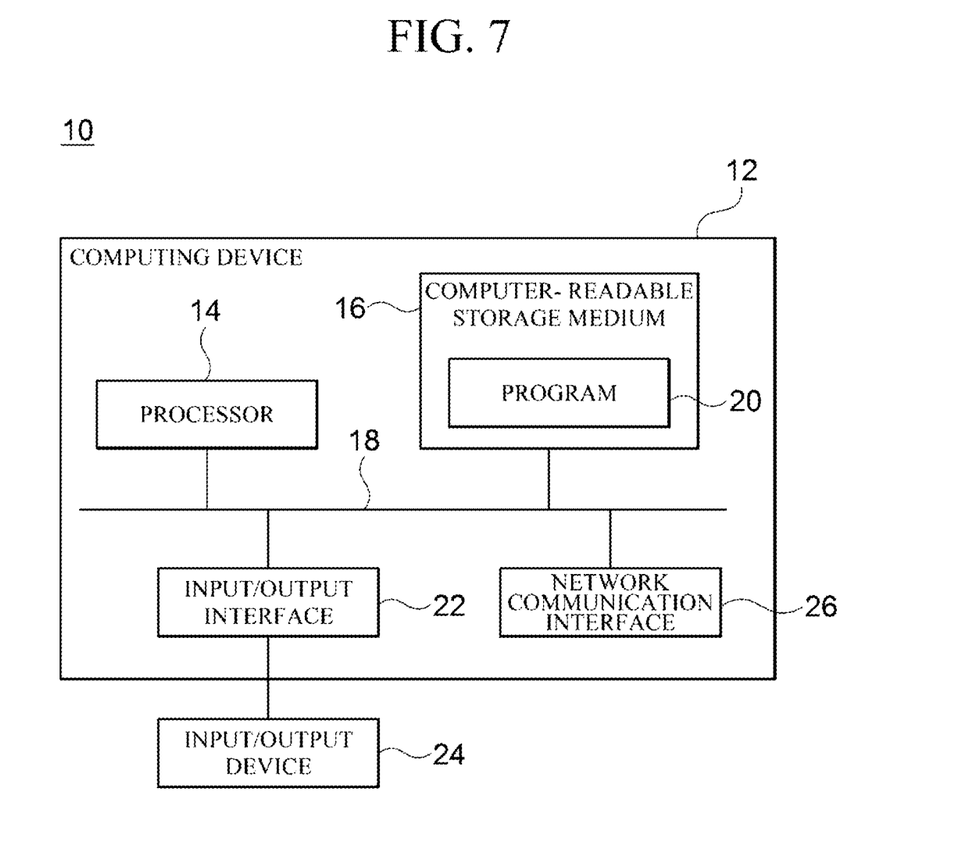
FIG. 7 is a block diagram for illustratively describing a computing environment including a computing device suitable for use in exemplary embodiments.

FIG. 7 is a block diagram for illustratively describing a computing environment including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the apparatus 100 for providing the necessary information for the diagnosis of Alzheimer's disease.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A computing device comprising:
one or more processors;
a memory; and
one or more programs, wherein
the one or more programs are stored in the memory and configured to be executed by the one or more processors,
the one or more programs include:
an instruction for acquiring a photographed image obtained by photographing a patient's eyeball,
an instruction for preprocessing the photographed image, generating a blood vessel image from the pre-processed photographed image using machine learning-based technology, and providing necessary information for a diagnosis of Alzheimer's disease based on the generated blood vessel image, and
an instruction for generating diagnostic prediction information based on the necessary information for a diagnosis of Alzheimer's disease,
wherein the instruction for providing the necessary information for the diagnosis of Alzheimer's disease includes:
an instruction for generating a data set by extracting a retinal region from the photographed acquired image, and
an instruction for classifying a patient's risk rating for Alzheimer's disease from the data set by receiving the data set using a machine learning module,
wherein the instruction for classifying the patient's risk rating for Alzheimer's disease includes:
an instruction for generating a feature map from a retinal image included in the data set by receiving the data set using an encoder module,
an instruction for generating the blood vessel image based on the feature map by receiving the feature map using a decoder module,
an instruction for generating a final blood vessel image based on the retinal image, the feature map, and the blood vessel image by receiving the retinal image, the feature map, and the blood vessel image using a generation module, and
an instruction for performing category classification to provide the necessary information for the diagnosis of Alzheimer's disease based on the final blood vessel image by receiving the final blood vessel image using a classification module, wherein the instruction for classifying the patient's risk rating for Alzheimer's disease further includes:
an instruction for generating a feature map from a retinal image included in the data set by receiving the data set using an encoder module,
an instruction for generating the blood vessel image based on the feature map by receiving the feature map using a decoder module,
an instruction for generating a final blood vessel image based on the retinal image, the feature map, and the blood vessel image by receiving the retinal image, the feature map, and the blood vessel image using a generation module, and
an instruction for performing category classification to provide the necessary information for the diagnosis of Alzheimer's disease based on the final blood vessel image by receiving the final blood vessel image using a classification module,
wherein the generation module is trained to:
divide the feature map and the blood vessel image into the same size, respectively, by receiving the retinal image, the feature map, and the blood vessel image, generate a similarity distribution by comparing similarities between any one of a plurality of the divided blood vessel images and a plurality of the divided feature maps, respectively, reflect the similarity distribution in the retinal image, and extract a blood vessel from a region corresponding to any one of the plurality of divided blood vessel images from the retinal image using the retinal image in which the similarity distribution is reflected and any one of the plurality of divided blood vessel images.

2. The device of claim 1, wherein
the instruction for generating the data set further includes
an instruction for generating a retinal image by extracting a retinal region from the acquired photographed image,
an instruction for adjusting the retinal image to a preset size, and
an instruction for normalizing the adjusted retinal image.

3. The device of claim 1, wherein
the encoder module is trained to generate a feature map through a convolution operation while moving a first filter to the retinal image by receiving the retinal image.

4. The device of claim 1, wherein
the decoder module is trained to generate a blood vessel image from the feature map through a deconvolution operation while moving a second filter to the feature map by receiving the generated feature map.

5. The device of claim 1, wherein
the instruction for generating the final blood vessel image further includes
an instruction for repeating so that blood vessels are extracted from all regions of the retinal image by the generation module, and
an instruction for generating a final blood vessel image by using the blood vessels extracted from all regions of the retinal image.

6. The device of claim 1, wherein
the classification module is trained to classify a risk rating for Alzheimer's disease based on a preset reference image and the generated final blood vessel image by receiving the final blood vessel image.

7. A method for providing necessary information for a diagnosis of Alzheimer's disease performed by a computing device that includes one or more processors and a memory storing one or more programs executed by the one or more processors, the method comprising:
acquiring a photographed image obtained by photographing a patient's eyeball;
preprocessing the photographed image, generating a blood vessel image from the pre-processed photographed image using machine learning-based technology, and providing the necessary information for a diagnosis of Alzheimer's disease based on the generated blood vessel image; and
generating diagnostic prediction information based on the necessary information for the diagnosis of Alzheimer's disease,
wherein the providing of the necessary information for the diagnosis of Alzheimer's disease includes:
generating a data set by extracting a retinal region from the acquired photographed image, and
classifying a patient's risk rating for Alzheimer's disease from the data set by receiving the data set using a machine learning module,
wherein the classifying of the patient's risk rating for Alzheimer's disease includes:
generating a feature map from a retinal image included in the data set by receiving the data set using an encoder module,
generating the blood vessel image based on the feature map by receiving the feature map using a decoder module,
generating a final blood vessel image based on the retinal image, the feature map, and the blood vessel image by receiving the retinal image, the feature map, and the blood vessel image using a generation module, and
performing category classification to provide the necessary information for the diagnosis of Alzheimer's disease based on the final blood vessel image by receiving the final blood vessel image using a classification module, and
wherein the generation module is trained to:
divide the feature map and the blood vessel image into the same size, respectively, by receiving the retinal image, the feature map, and the blood vessel image, generate a similarity distribution by comparing similarities between any one of a plurality of the divided blood vessel images and a plurality of the divided feature maps, respectively, reflect the similarity distribution in the retinal image, and extract a blood vessel from a region corresponding to any one of the plurality of divided blood vessel images from the retinal image using the retinal image in which the similarity distribution is reflected and any one of the plurality of divided blood vessel images.

8. The method of claim 7, wherein
the generating the data set further includes
generating a retinal image by extracting a retinal region from the acquired photographed image,
adjusting the retinal image to a preset size, and
normalizing the adjusted retinal image.

9. The method of claim 7, wherein
the encoder module is trained to generate a feature map through a convolution operation while moving a first filter to the retinal image by receiving the retinal image.

10. The method of claim 7, wherein
the decoder module is trained to generate a blood vessel image from the feature map through a deconvolution operation while moving a second filter to the feature map by receiving the generated feature map.

11. The method of claim 7, wherein
the generating the final blood vessel image further includes
repeating so that blood vessels are extracted from all regions of the retinal image by the generation module, and
generating a final blood vessel image by using the blood vessels extracted from all regions of the retinal image.

12. The method of claim 7, wherein
the classification module may be trained to classify a risk rating for Alzheimer's disease based on a preset reference image and the generated final blood vessel image by receiving the final blood vessel image.

13. A computer program stored in a non-transitory computer readable storage medium, wherein
the computer program includes one or more instructions that, when executed by a computing device including one or more processors, cause the computing device to:
acquire a photographed image obtained by photographing a patient's eyeball;
pre-process the photographed image, generate a blood vessel image from the pre-processed photographed image using machine learning-based technology, and provide necessary information for a diagnosis of Alzheimer's disease based on the generated blood vessel image; and
generate diagnostic prediction information based on the necessary information for the diagnosis of Alzheimer's disease,
wherein the providing of the necessary information for the diagnosis of Alzheimer's disease includes:
generating a data set by extracting a retinal region from the acquired photographed image, and
classifying a patient's risk rating for Alzheimer's disease from the data set by receiving the data set using a machine learning module,
wherein the classifying of the patient's risk rating for Alzheimer's disease includes:
generating a feature map from a retinal image included in the data set by receiving the data set using an encoder module,
generating the blood vessel image based on the feature map by receiving the feature map using a decoder module,
generating a final blood vessel image based on the retinal image, the feature map, and the blood vessel image by receiving the retinal image, the feature map, and the blood vessel image using a generation module, and
performing category classification to provide the necessary information for the diagnosis of Alzheimer's disease based on the final blood vessel image by receiving the final blood vessel image using a classification module, and
wherein the generation module is trained to:
divide the feature map and the blood vessel image into the same size, respectively, by receiving the retinal image, the feature map, and the blood vessel image, generate a similarity distribution by comparing similarities between any one of a plurality of the divided blood vessel images and a plurality of the divided feature maps, respectively, reflect the similarity distribution in the retinal image, and extract a blood vessel from a region corresponding to any one of the plurality of divided blood vessel images from the retinal image using the retinal image in which the similarity distribution is reflected and any one of the plurality of divided blood vessel images.

* * * * *